(12) United States Patent
Tipton

(10) Patent No.: US 10,021,867 B2
(45) Date of Patent: Jul. 17, 2018

(54) FISH TRANSFER BAG

(71) Applicant: Judy L. Tipton, Bagdad, KY (US)

(72) Inventor: Judy L. Tipton, Bagdad, KY (US)

( * ) Notice: Subject to any disclaimer, the term of this patent is extended or adjusted under 35 U.S.C. 154(b) by 163 days.

(21) Appl. No.: 14/545,652

(22) Filed: Jun. 2, 2015

(65) Prior Publication Data

US 2016/0100565 A1 Apr. 14, 2016

Related U.S. Application Data

(60) Provisional application No. 61/997,439, filed on Jun. 2, 2014.

(51) Int. Cl.
*A01K 97/20* (2006.01)

(52) U.S. Cl.
CPC .................................... *A01K 97/20* (2013.01)

(58) Field of Classification Search
CPC ................................ A01K 97/20; A01K 97/05
USPC ........................................................... 43/55
See application file for complete search history.

(56) References Cited

U.S. PATENT DOCUMENTS

| | | | | |
|---|---|---|---|---|
| 1,167,497 A * | 1/1916 | Hayes | ................... | B65D 33/007 220/904 |
| 2,722,770 A * | 11/1955 | Giordano | ............... | A01K 97/05 220/200 |
| 3,053,005 A * | 9/1962 | Byers | ....................... | A01K 97/20 224/610 |
| 3,062,421 A * | 11/1962 | Fleming | ................. | A01K 97/06 190/16 |
| 3,565,041 A | 2/1971 | Brooks | | |
| 3,674,188 A * | 7/1972 | Anderson | .............. | A01K 97/20 224/603 |
| 4,054,005 A * | 10/1977 | Lightfoot | ............... | A01K 97/05 224/241 |
| 4,498,190 A * | 2/1985 | Garlick, III | ........... | A01K 63/02 119/201 |
| 5,050,535 A | 9/1991 | McKellar et al. | | |
| 5,138,975 A * | 8/1992 | Walsh | .................... | A01K 63/02 119/203 |
| D362,753 S * | 10/1995 | Bland | ......................... | D22/136 |
| 5,463,983 A * | 11/1995 | Nagaura | ................ | A01K 63/02 119/203 |
| 5,507,114 A * | 4/1996 | Stricker | ................. | A01K 97/04 43/54.1 |
| 5,526,575 A * | 6/1996 | Hoover | .................... | G01B 3/02 33/485 |
| 6,306,352 B1 | 10/2001 | Yoshida et al. | | |
| 6,557,492 B1 * | 5/2003 | Robohm | ................ | A01K 63/02 119/203 |
| 6,612,259 B2 | 9/2003 | Yoshida et al. | | |

(Continued)

*Primary Examiner* — Christopher P Ellis
(74) *Attorney, Agent, or Firm* — Carrithers Law Office, PLLC

(57) ABSTRACT

A bag for conveniently holding fish in water safely and for weighing the fish during a fishing tournament. The bag comprises a polymeric material which is water tight but allows oxygen to pass into the bag and carbon dioxide to pass out of the bag. The bag is fold-able but when filled with water, the bag has no right angle corners where fish tend to congregate and crowd one another. An optional hoop is provided which integrates with the side wall of the bag and will force the shape of the bag to remain in a preferred more rounded configuration. One embodiment includes a sealable closure at the top to fixedly contain the water and fish.

13 Claims, 5 Drawing Sheets

(56) References Cited

U.S. PATENT DOCUMENTS

| | | | |
|---|---|---|---|
| 6,662,488 B1* | 12/2003 | Heimbrock | A01K 97/20 206/315.11 |
| 7,219,465 B2* | 5/2007 | Beech | A01K 97/05 43/55 |
| 8,393,110 B2 | 3/2013 | Ball | |
| 8,454,236 B2 | 6/2013 | Ramirez | |
| 2006/0112609 A1* | 6/2006 | Lee | A01K 97/05 43/57 |
| 2007/0169400 A1* | 7/2007 | Ball | A01K 97/20 43/55 |
| 2008/0210625 A1 | 9/2008 | Mitchell | |
| 2008/0307693 A1* | 12/2008 | Wessels | A01K 97/20 43/55 |
| 2012/0102811 A1* | 5/2012 | Waugh | A01K 77/00 43/6 |
| 2012/0294554 A1 | 11/2012 | Jian et al. | |
| 2013/0340318 A1* | 12/2013 | Morici | A01K 97/20 43/55 |
| 2015/0082686 A1* | 3/2015 | Merritt | A01K 97/20 43/55 |

* cited by examiner

FISH TRANSFER BAG

CROSS REFERENCE TO RELATED APPLICATIONS

This application claims priority to U.S. Provisional Application Ser. No. 61/997,439 filed on Jun. 2, 2014 and is incorporated herein in its entirety.

TECHNICAL FIELD

The present invention relates to the field of tournament weight in bags for storing fish until an official weigh-in is performed in a fishing tournament.

BACKGROUND OF THE INVENTION

Fishing tournaments are becoming more popular and commonplace in America. To compete, a fisherman must bring the live fish he has caught to an official weigh station. Fishing boats are generally equipped with a number of 'live wells' in which fish are placed and stored until the weigh-in, which may happen hours after fish are caught. Ideally, a fisherman will handle his catch carefully and as little as possible to prevent damage or injury to the fish and or himself. A separate container is useful to carry the fish to the scales. A collapsible bag which fists into a live well is preferable because of the ease of storage and the ease of getting the bag into and out of the rigid 'live well' in the boat.

A game or sport fish which is caught by the angler is individually inserted into such a bag, which is then closed with the fish inside. The bag and fish may be placed safely in a live well. Later, the bag with the fish inside is weighed. The fish may be released or the bag and fish may be returned to the live well. The bag protects the fish from the live well environment and the damage caused by human contact, while allowing the fish to be easily identified and retrieved.

Ideally, when a fish is intended to be released, human handling should be kept to a minimum. Human contact can transmit fungus or other contagious disease to the fish. Contact with the fish can damage the fish's mucous layer which lubricates the fish in the water. Caught fish can be conveniently handled and stored in a live, healthy condition, avoiding unnecessary touching of the fish, enabling a greater degree of safety to the fish. Therefore, the fish can be released in a healthier condition. Also, when the fish are weighed, the bag provides a suitable means to separate the water from the fish, enabling immediate weighing without human contact with the fish, thereby allowing the entire process from the initial capture to final release to occur with minimal direct human contact. Like any other animal, fish require oxygen. Anything which contains fish needs to contain oxygen but needs to be able to rid itself of carbon dioxide.

Conventional tournament weigh-in bags currently available to anglers in the recreational fishing market do not provide any oxygen and carbon dioxide gas exchange and typically utilize corners where the fish congregate causing crowding and reducing the concentration of oxygen in the water available to the fish.

DESCRIPTION OF THE RELATED ART

U.S. Pat. No. 8,393,110 for LIVE SPORT FISH PROTECTION SYSTEM by Ball which issued on Mar. 12, 2013 teaches a polymeric mesh storage bag to hold a fish and a transfer bag with a mesh top portion and a non-mesh bottom portion capable of containing the mesh storage bag holding a fish and water.

U.S. Pat. No. 3,565,041 for METHOD OF CARRYING AND STORING LIVE FISH by Aleck G. Brooks which issued on Feb. 23, 1971 teaches a live fish bag shaped like a balloon with no corners or overlapping of bag material.

SUMMARY OF THE INVENTION

Transfer offish from the boat to the dock for weighing in fishing competition stresses the live fish because they deplete the oxygen in the water. The invention uses a polymer which allows oxygen to absorb into the water from the air and lets $CO_2$ escape from the water into the air.

The transfer bag is composed of a mesh in order to support the sheets of breathable film. The material of construction is a polypropylene core with ethylene vinyl acetate "EVA" adhesive. The substrate material is a polyolefin multilayer. It is of some importance for the bag to be full of water minimizing the amount of air in the bag. A vent or plug or finger pump may be used to bleed off air. A positive pressure in the bag increases gas transfer. The bottom of the bag may include a oval or rectangular ring member having rounded corners to eliminate right angle bag corners because fish tend to congregate in these corners and restrict movement of their gills. The bag includes a sealing means, for instance an air tight seal created by using Velcro. The bag shown is stitched and includes handles glued, sewn, heat sealed, or welded to the bag.

In accordance with the present invention, there is provided a fish transfer bag comprising, consisting of, or consisting essentially of a bag body with a bottom, four upright sides, rounded corners and an open top. The bottom side and four sides comprise at least one polymeric film layer with interwoven mesh capable of supporting a load of water and fish up to the top of the four sides. Carbon dioxide and oxygen are capable of passing through the film. The top edges of the four sides have a support band affixed to them. A pair of looped handles is fixedly attached to opposing sides of the support band. A plurality of hook and loop fasteners are attached around the periphery of the bag body parallel to and above the bottom side. The hook and loop fasteners hold a shape retaining rounded hoop in place around the bag body.

The bag is composed of a mesh in order to support the sheets of breathable film. It is of some importance for the bag to be full of water minimizing the amount of air in the bag. A vent or plug or finger pump may be used to bleed off air. A positive pressure in the bag increases gas transfer. The bottom of the bag may include a oval ring member to eliminate corners because fish tend to congregate in these corners and restrict movement of their gills. One embodiment includes a sealing means, possibly an air tight seal created by using hook and loop fasteners or a zip-able closure.

The transfer bag is used to transfer the fish within the support mesh-bag safely. The entire bag is composed of mesh to enable oxygenated water to freely exchange through the multilayer transfer bag. It is anticipated that a portion of the transfer bag can be constructed of dark polymeric material that does not transmit light and that the outer surface of the bag may include a foil or be fabricated from a light reflecting material to deflect heat. The water contained in the bag acts as a live-well while transporting the fish to the weighing station. In this manner, a fish can be transferred to the weighing station without any human contact. The transfer bags with mesh and film multiply construction allows the fish to remain suspended in a live well without suffering damages from other objects and fish in the well.

It is an object of this invention to provide a live fish transfer bag comprising polymeric water tight material which allows oxygen into the bag and allows carbon dioxide to escape the bag.

It is an object of this invention to provide a live fish transfer bag which includes a sealing closure such as hook and loop material or a zipper-like closure to securely hold the bag closed and forcibly hold water within the bag.

It is an object of the present invention to include a multi-layer wall having a semi-permeable membrane positioned therein including at least one gas permeable membrane layer permits the passage of air into and out of the bag, but prevents the passage of water there through.

It is an object of the present invention to include rounded or angled corners rather than corners having right angles to prevent the fish from congregating in the corners and reducing the oxygen in the water required for respiration.

It is an object of this invention to provide a live fish transfer bag which is manufactured with no right angle corners which encourage fish to congregate or crowd into these corners.

It is an object of this invention to provide a live fish transfer bag which includes a hoop, rib or other shape retaining device which can be fastened in place to maintain a rounded shape to the bag.

It is an object of this invention to provide a live fish transfer bag which includes fasteners such as hook and loop fasteners to fixedly hold a shape retaining hoop in place either inside or outside the wall of the bag.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the views wherein.

DESCRIPTION OF THE PREFERRED EMBODIMENTS

In accordance with the present invention as shown in FIGS. 1-8, there is provided a fish transfer bag 10 including a bag body 12, a pair of handles 16 and a support band 14 for sturdy attachment of the handles 16 to the bag body 12.

Figure 1:
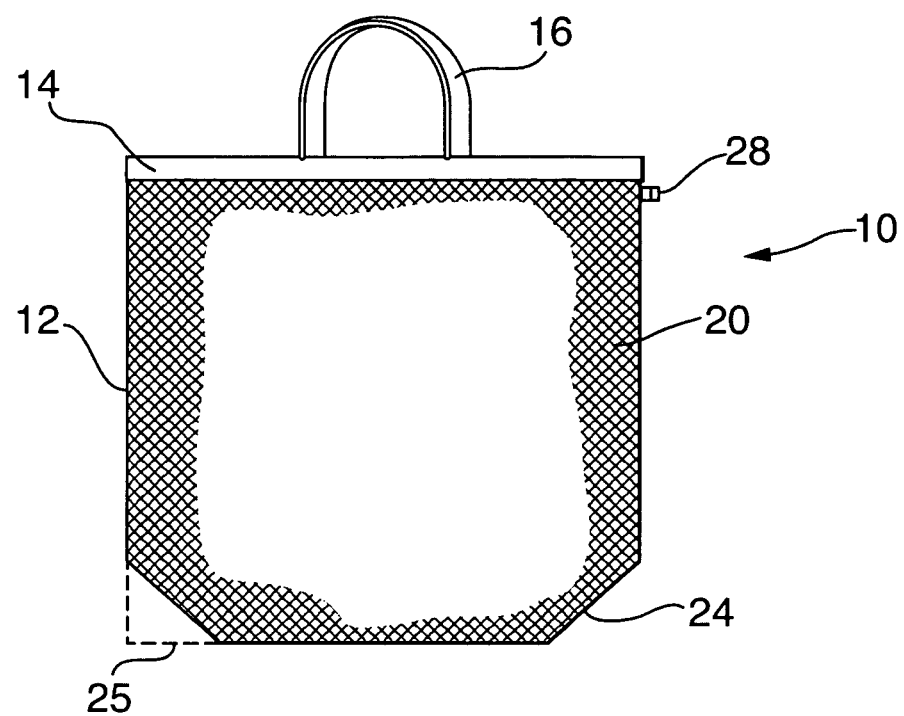
FIG. 1 is a front view of the fish transfer bag having sewn angled corners and a multi-layer mesh sidewall and bottom.

As shown in FIG. 1, the fish transfer bag 10 comprises or consists of a bag body with a bottom 20 integrally connecting to upright side walls 22 with the corners of the bag 10 are sewn or sealed together by heat or an adhesive to eliminate the corners (shown in broken lines) forming angled corners 24. The flexible corner flaps 25 formed from the sewn corners may be removed or left on the bag.

Figure 2:
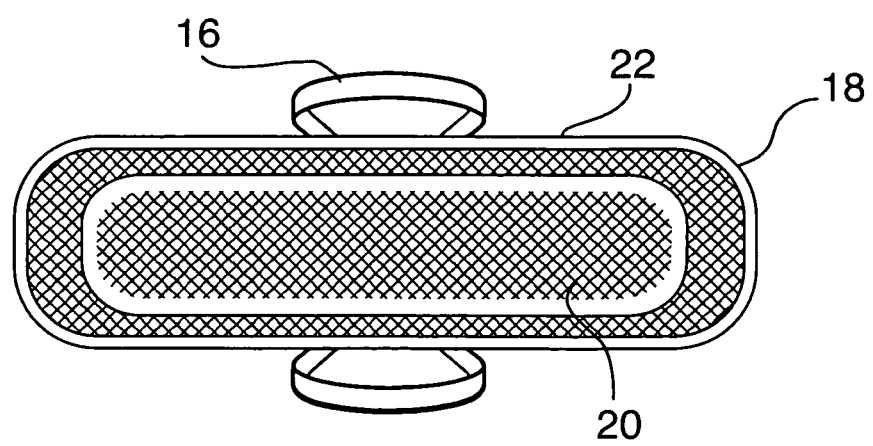
FIG. 2 is a top view of the fish transfer bag having rounded corners and multi-layer mesh sidewalls and bottom.
Figure 4:
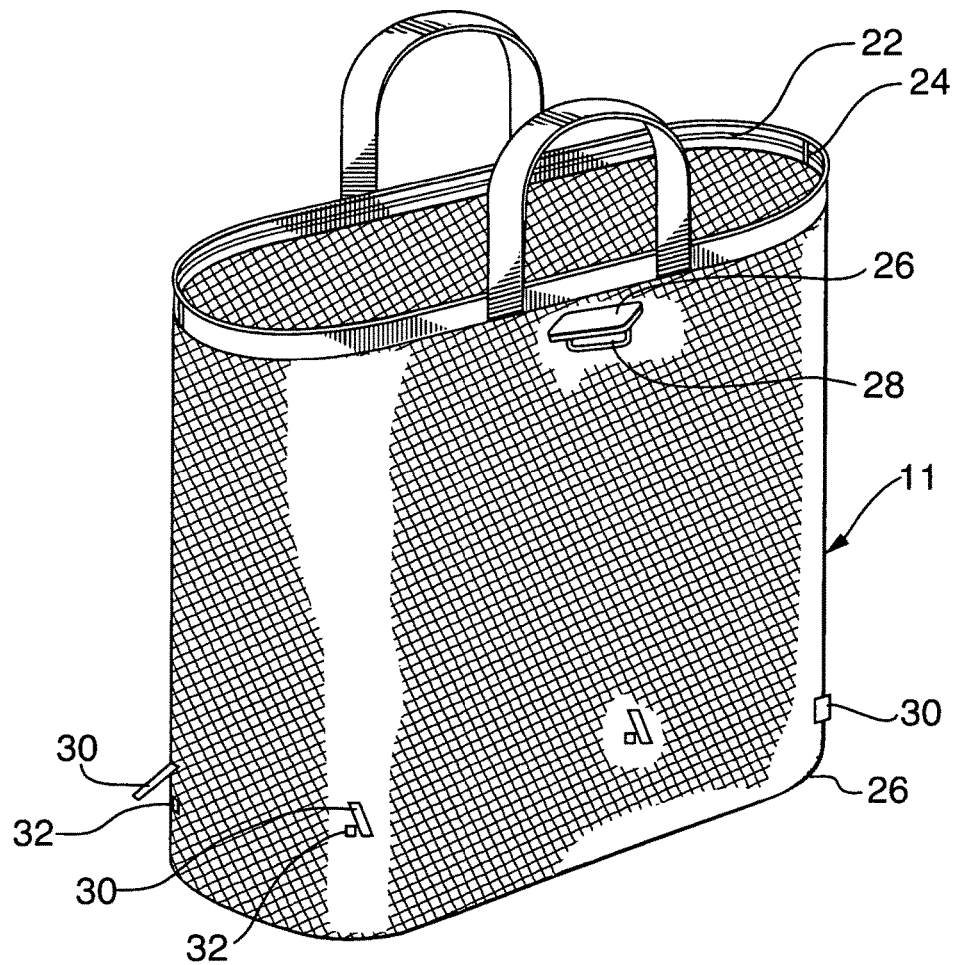
FIG. 4 is a side perspective view of the fish transfer bag including a zipper closure at the top and hook and loop fasteners for holding a shape retaining hoop.

The embodiment of the bag 11 shown in FIGS. 2 and 4 comprises or consists of a bag having rounded corners 26 and an open top.

Figure 7:
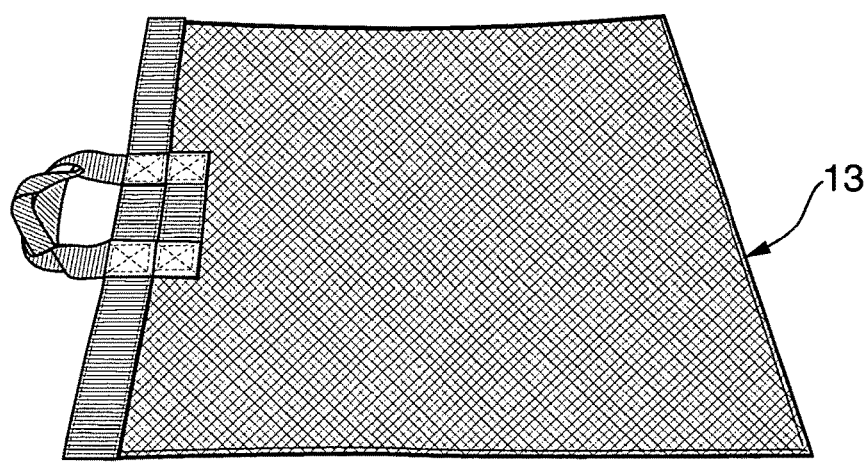
FIG. 7 shows a handle sewn to a reinforcement strip of material which is attached by sewing, adhesion, heat sealing or other bonding means to the top edge of the bag sidewalls.
Figure 8:
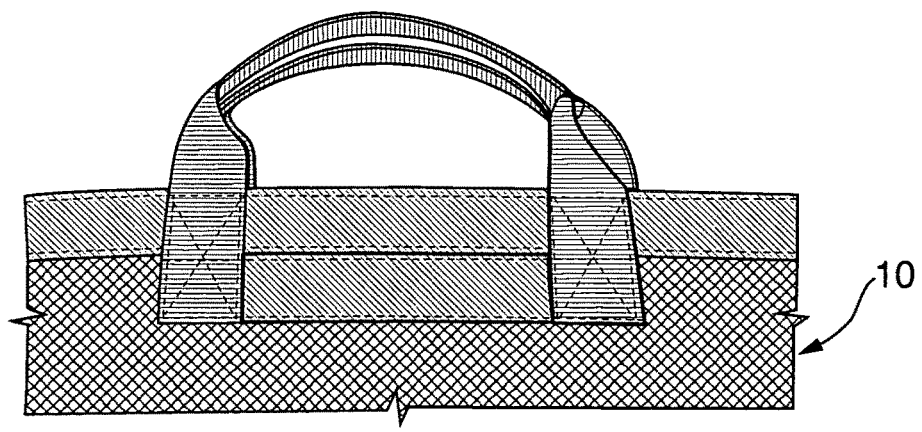
FIG. 8 is an enlargement of the handles and reinforcement strip of FIG. 7.

The embodiment of the fish transfer bag 13 shown in FIG. 7 comprises or consists of a bag body with a bottom 20 intergrally connecting to upright side walls 22 as shown in FIG. 7.

A preferred embodiment includes a generally rectangular bag having rounded corners or angled corners.

All of the bags 10, 11, and 13 include a bottom side and four sides comprising or consisting of at least one polymeric film layer with interwoven mesh capable of supporting a load of water and fish up to the top of the four sides. Carbon dioxide and oxygen are capable of passing through the film. The top edges of the four sides have a support band affixed to them. A pair of looped handles is fixedly attached to opposing sides of the support band. A plurality of hook and loop fasteners are attached around the periphery of the bag body parallel to and above the bottom side. The hook and loop fasteners hold a shape retaining rounded hoop in place around the bag body.

Figure 9:
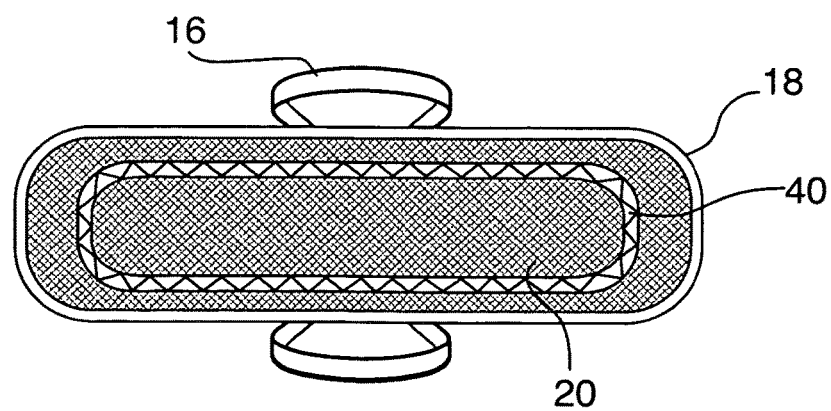
FIG. 9 is a perspective view of a shape retaining hoop showing the insertable collapsible frame.

Moreover, a collapsible frame maybe be removably inserted into the bag to add structural support to the bag filled with water and shape the corners. Removal of the frame 40 allows the bag can be stored in a small area after draining water therefrom as shown in "FIG. 9.

In one preferred embodiment, the webbing comprises a polypropylene core with ethylene vinyl acetate "EVA". A conventional adhesive can be used to join the bags at the seams. The breathable gas permeable film is comprised of multilayer of polyolefin.

Figure 5:
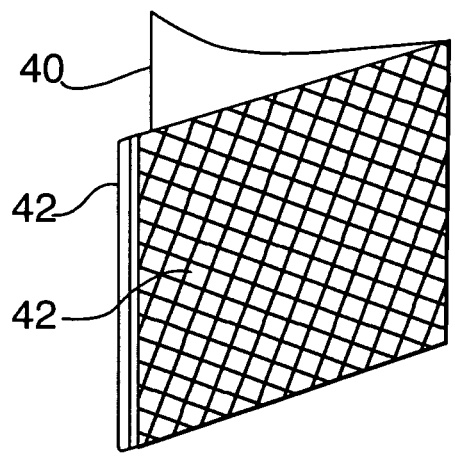
FIG. 5 is a view of the multilayer polymeric film used in the sidewalls of the bag including a breathable gas permeable film between a inner and outer layer of mesh.
Figure 6:
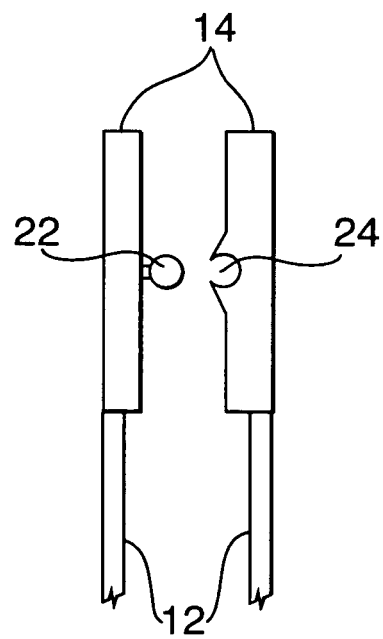
FIG. 6 is a perspective view of a polymeric film with interwoven mesh.

As shown in FIG. 5, the bag body 12 comprises a layer of polymeric film 40 which allows carbon dioxide to pass out of the bag and oxygen to enter into the bag. An interwoven mesh 42 is bonded to the gas permeable polymeric layer 40 for strength. Moreover, the film in the present invention creates or promotes an equilibrium between the level of oxygen and carbon dioxide in the water in the bag with the oxygen and carbon dioxide level in the air surrounding the bag reducing the accumulation of carbon dioxide in water in the bag containing live fish.

It is also anticipated that a breathable material such as is disclosed in US Patent Publication No. 20080210625 for a Micro-Perforated Laminae and Method hereby incorporated by reference, may utilize a breathable polymeric film comprising or consisting of a micro-perforated laminae includes providing a layer of polypropylene, polyethylene, polyethylene terephthalate, nylon 6, nylon 66, polycarbonate, polyethylene terephthalate glycol, high impact polystyrene, polyacrylonitrile-butadiene-styrene, polyacrylate, polytetrafluoroethylene, polyvinylfluoride, polyvinylchloride, chloride, polyvinylidenefluoride, cellulose acetator, polyvinylidenechloride, linear low density polyethylene or low density polyethylene, or a combination of any continuous film material. The layer of material is micro-perforated to form a plurality of micro-slits having a length of about 1 mm each spaced-apart on the thermoplastic layer at a density per square area ranging from 10 cm centers to 0.2 cm centers. The micro-slits define a total open orifice area that includes about 0.1% to 17.0% of the total surface area of the layer. In addition, the film, foil, web or sheet is preferably polypropylene (PP), polyethylene (PE), polyethylene terephthalate (PET), nylon 6 (N6), nylon 66 (N6,6), polycarbonate (PC), polyethylene terephthalate glycol (PETG), high impact polystyrene (HIPS), polyacrylonitrile-butadiene-styrene (ABS) or polyacrylate, polytetrafluoroethylene (PTFE), polyvinylfluoride (PVF), polyvinylchloride (PVC), chloride (CPVC), polyvinylidenefluoride (PVDF), polyvinylidenechloride (PVDC), cellulose acetate, or another suitable continuous film material. The film, foil, web or sheet preferably has a weight of between 8 g/m.sup.2 (0.25 oz/yd.sup.2) and 680 g/m.sup.2 (20.0 oz/yd.sup.2). The film, foil, web, or sheet may need a surface coating treatment to alter the surface energy. Suitable surface coating/treatments include silicone, fluorocarbon, acrylic, corona treatment, flame treatment, and polyurethane.

A mesh-bag, of polymeric mesh material such as polyolefin, including polyethylene, polypropylene, or the like, or plasticized polyvinyl chloride, or any suitable polymer or copolymer, is specifically adapted to allow water to circulate throughout the bag interior. Any material, polymeric or coated metallic, or fabric, is within the scope of the invention and it is understood that the exact material is not critical to practice of the invention.

Figure 3:
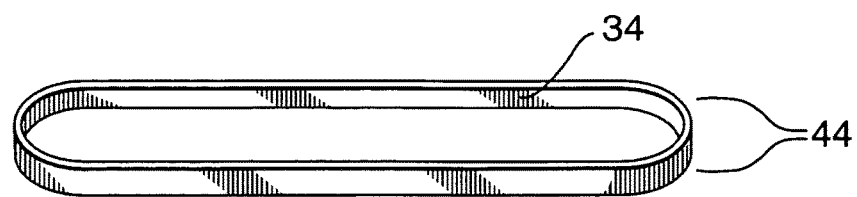
FIG. 3 is a perspective view of a shape retaining hoop.

One embodiment of the transfer bag shown in FIG. 3 includes hook and loop fasteners 30 and 32 around the periphery of the bag body 12. A hoop 34, shown in FIG. 3 is placed around the periphery of the bag and the hook and loop fasteners 30 and 32 are pressed together around the hoop 34. The placement of the hoop around the bag forces the bag to retain the rounded shape seen in FIG. 2 and also serves a s reinforcement to help support the weight of the water and fish.

Other embodiments of the fish transfer bag include a closure at the top of the bag. One closure comprises opposing hook and corresponding loop fasteners at selected positions on the inside surface of the support band 14. Another embodiment has a zip-able closure as shown in FIG. 3. The inside surface of one half of the support band includes a inward extending bead 22 while the inside surface of the opposite half of the support band includes a slot 24 which will removably and firmly accept the bead 22 of the first half of the closure. A simple draw string, or belt and buckle can be used to close the bag as well.

Another embodiment of the fish transfer bag includes a sealable air valve 28 as shown in FIG. 1. Although not a requirement, a slight increase in air pressure over the water will enhance absorption of gases from the air when the bag is sealed for transporting the live fish. The pressure can be increased by a manual air pump or electric air pump device.

As shown in FIG. 3, the lid 26 is hinged to an open rim 28. The lid 26 is capable of being snapped tightly down over the rim 28 to seal the bag or can be raised to an open position to release air or water from the bag.

As illustrated in FIG. 4, a drain 30 with a friction fit plug or threaded aperture and threaded plug may be included for draining the bag.

Figure 10:
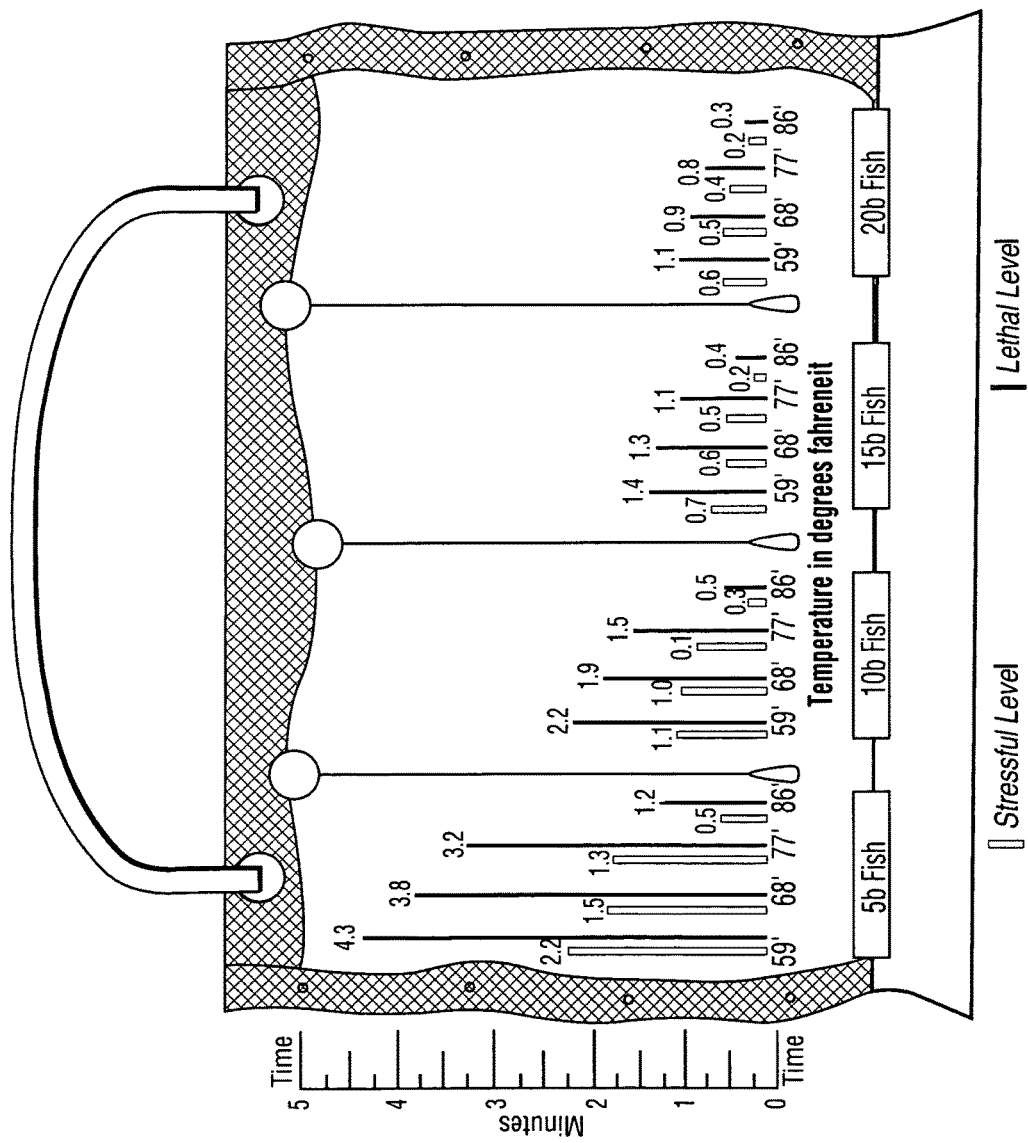
FIG. 10 is a bag oxygen depletion chart showing depletion levels of oxygen over time at increased temperatures.

FIG. 10 shows a bag oxygen depletion chart from an article entitled "Keeping Bass Alive", *A Guidebook for Angles and Tournament Organizers*, published by ESPN PRODUCTIONS, INC./B.A.S.S. in 2002 written by Gene Gillarnd and Hal Schramm showing depletion levels of oxygen over time at increased temperatures which is incorporated herein in its entirety.

The foregoing detailed description is given primarily for clearness of understanding and no unnecessary limitations are to be understood therefrom, for modification will become obvious to those skilled in the art upon reading this disclosure and may be made without departing from the spirit of the invention and scope of the appended claims. Accordingly, this invention is not intended to be limited by the specific exemplification presented herein above.

I claim:

1. A fish transfer bag comprising:
   a bag body with a bottom side, four upright sides, rounded corners and an open top, said bottom side and four sides comprising an interwoven mesh material including a semi-permeable membrane capable of supporting a load of water and fish up to the top of said four sides, said interwoven mesh material including a semi-permeable membrane transferring carbon dioxide in fluid communication therewith produced from the respiration of at least one fish contained in said load of water therethrough to air surrounding the bag body, and said interwoven mesh material including said semi-permeable membrane transferring oxygen from said air surrounding said bag body therethrough and into said load of water in fluid communication therewith;
   a top edge of said four sides having a support band affixed thereto;
   a pair of looped handles fixedly attached to opposing sides of said support band; and
   a plurality of hook and loop fasteners around a periphery of said bag body, said fasteners holding a shape retaining rounded hoop around said bag body parallel to and above said bottom side.

2. The fish transfer bag defined in claim 1 further including a closure integral with said support band for seal-ably closing said fish transfer bag, said closure selected from the group consisting of hook and loop fasteners and a zip-able closure comprising an inward extending bead on a first side and an opposing slot on a second side.

3. The fish transfer bag defined in claim 1 including a release valve near a top edge of one said four sides of said bag body.

4. A weigh and release fish transfer bag of claim 1 wherein said bag body comprises a semi-permeable membrane of polypropylene and said interwoven mesh material comprises a polypropylene core and an ethylene vinyl acetate.

5. A weigh and release fish transfer bag of claim 1 wherein said semi-permeable membrane promotes an equilibrium between a level of oxygen and a level of a carbon dioxide in said load of water in said bag body with a level of oxygen and a level of carbon dioxide level in said air surrounding said bag body.

6. A weigh and release fish transfer bag of claim 1 wherein said semi-permeable membrane is selected from the group consisting of polypropylene, polyethylene, polyethylene terephthalate, nylon 6, nylon 66, polycarbonate, polyethylene terephthalate glycol, high impact polystyrene, polyacrylonitrile-butadiene-styrene, polyacrylate, polytetrafluoroethylene, polyvinylfluoride, polyvinylchloride, chloride, polyvinylidenefluoride, cellulose acetator, polyvinylidenechloride, linear low density polyethylene or low density polyethylene, and combinations thereof.

7. A weigh and release fish transfer bag comprising:
a bag body with a bottom side, four upright sides, rounded corners and an open top, said bottom side and four sides comprising an interwoven mesh material including a semi-permeable membrane capable of supporting a load of water and fish up to the top of said four sides, said interwoven mesh material including a semi-permeable membrane transferring carbon dioxide in fluid communication therewith produced from the respiration of at least one fish contained in said load of water therethrough to air surrounding the bag body, and said interwoven mesh material including said semi-permeable membrane transferring oxygen from said air surrounding said bag body therethrough and into said load of water in fluid communication therewith;
a top edge of said four sides having a support band affixed thereto; and
handle means on opposing sides of said support band.

8. The weigh and release fish transfer bag of claim 7 wherein said handle means comprises a pair of spaced apart looped handles fixedly attached to a top edge of said support band.

9. The weigh and release fish transfer bag of claim 7 wherein said handle means including a plurality of hook and loop fasteners around a periphery of said bag body, said fasteners holding a shape retaining hoop around said bag body parallel to and above said bottom side.

10. A weigh and release fish transfer bag of claim 7 wherein said bag body comprises a semi-permeable membrane of polypropylene and said interwoven mesh material comprises a polypropylene core and an ethylene vinyl acetate.

11. A weigh and release fish transfer bag of claim 7 wherein said semi-permeable membrane promotes an equilibrium between a level of oxygen and a level of a carbon dioxide in said load of water in said bag body with a level of oxygen and a level of carbon dioxide level in air surrounding said bag body.

12. A weigh and release fish transfer bag of claim 7 wherein said semi-permeable membrane is selected from the group consisting of polypropylene, polyethylene, polyethylene terephthalate, nylon 6, nylon 66, polycarbonate, polyethylene terephthalate glycol, high impact polystyrene, polyacrylonitrile-butadiene-styrene, polyacrylate, polytetrafluoroethylene, polyvinylfluoride, polyvinylchloride, chloride, polyvinylidenefluoride, cellulose acetator, polyvinylidenechloride, linear low density polyethylene or low density polyethylene, and combinations thereof.

13. A weigh and release fish transfer bag consisting of:
a bag body with a bottom side, four upright sides, rounded corners and an open top, said bottom side and four sides comprising an interwoven mesh material including a semi-permeable membrane capable of supporting a load of water and fish up to the top of said four sides, said interwoven mesh material including a semi-permeable membrane transferring carbon dioxide in fluid communication therewith produced from the respiration of at least one fish contained in said load of water therethrough to air surrounding the bag body, and said interwoven mesh material including said semi-permeable membrane transferring oxygen from said air surrounding said bag body therethrough and into said load of water in fluid communication therewith;
a top edge of said four sides having a support band affixed thereto; and
handle means on opposing sides of said support band.

\* \* \* \* \*